W. H. FOX.
DEMOUNTABLE RIM.
APPLICATION FILED JUNE 28, 1919.
1,371,676.
Patented Mar. 15, 1921.
4 SHEETS—SHEET 2.
Fig. 3
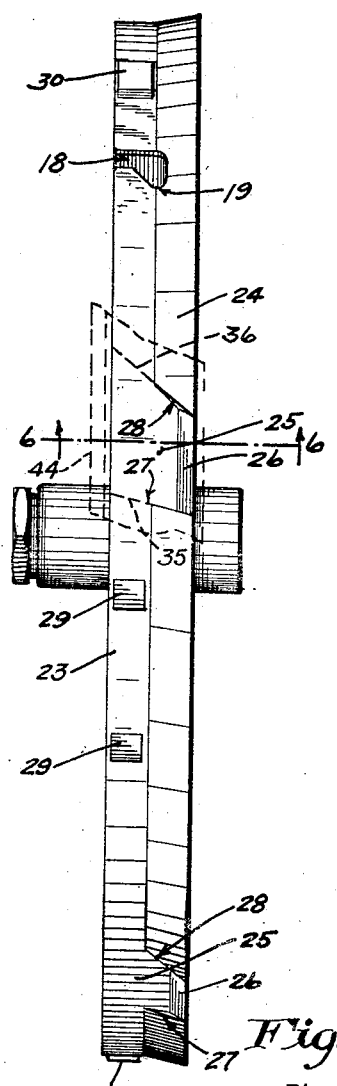
Fig. 5
Fig. 4
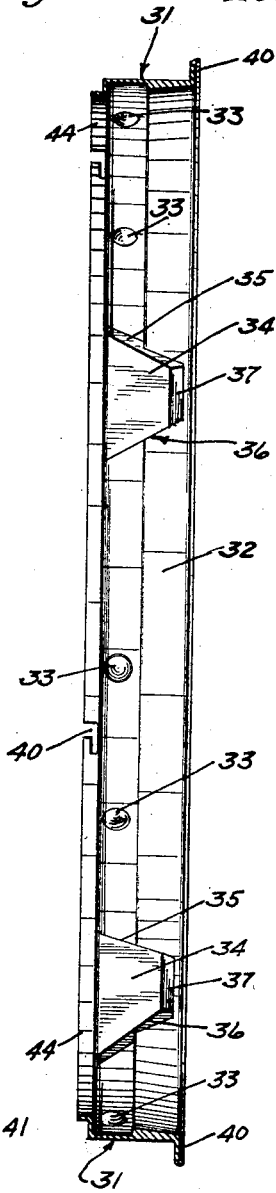
Fig. 6
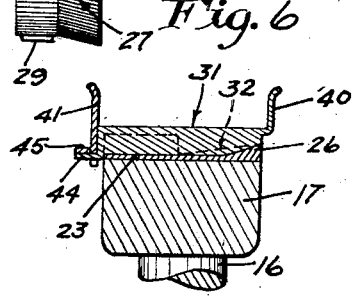
Inventor
William H. Fox
By his Attorneys
Williamson Dunlap

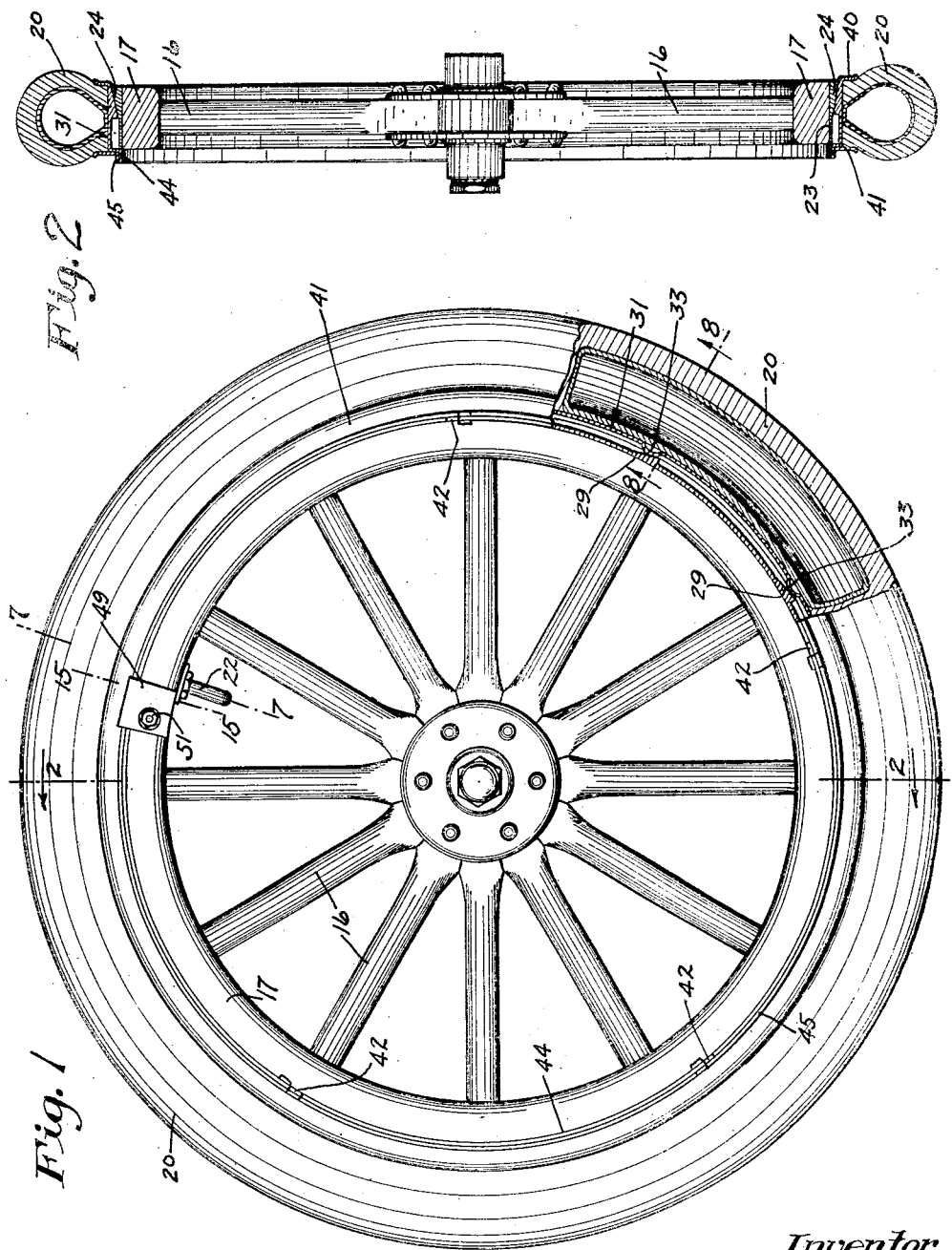

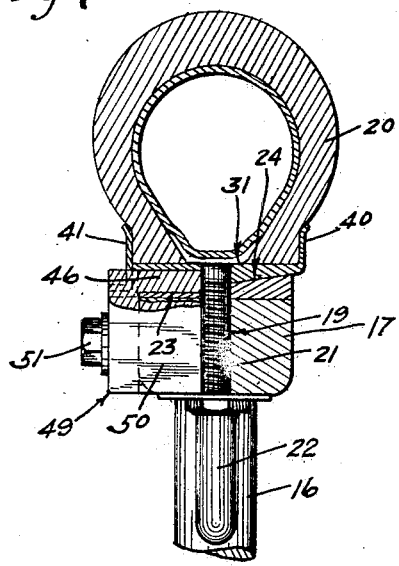
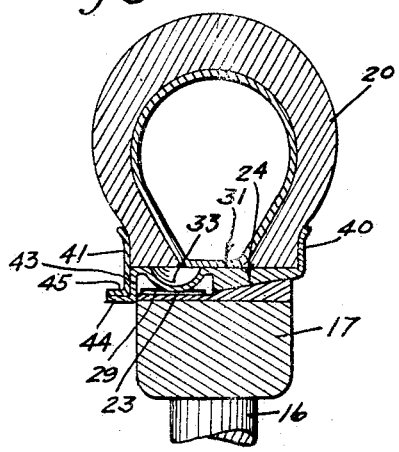
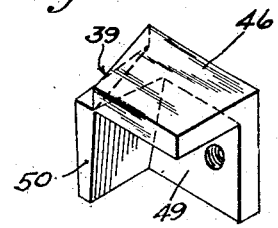
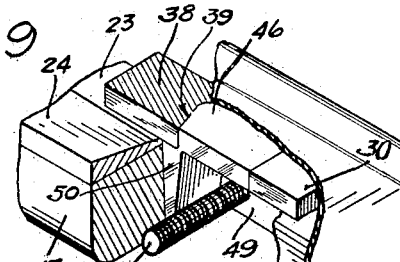
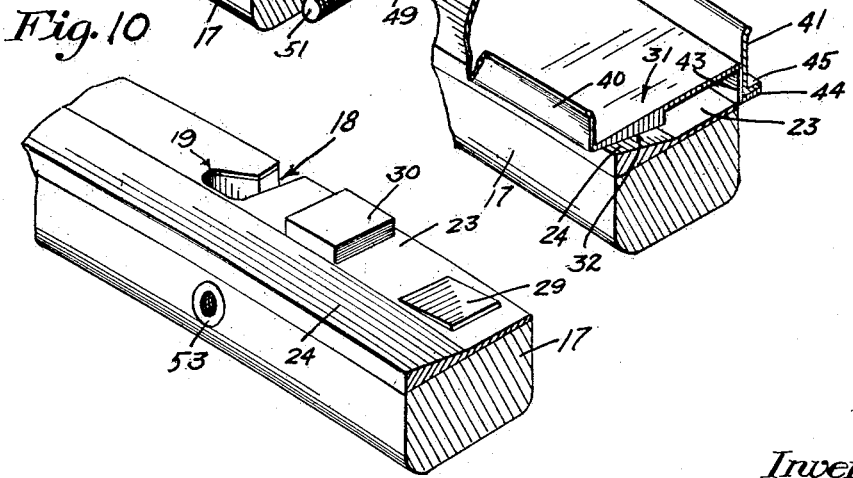

W. H. FOX.
DEMOUNTABLE RIM.
APPLICATION FILED JUNE 28, 1919.

1,371,676.

Patented Mar. 15, 1921.
4 SHEETS—SHEET 4.

Inventor
William H. Fox
By his Attorneys

UNITED STATES PATENT OFFICE.

WILLIAM H. FOX, OF MINNEAPOLIS, MINNESOTA.

DEMOUNTABLE RIM.

1,371,676.  Specification of Letters Patent.  Patented Mar. 15, 1921.

Application filed June 28, 1919. Serial No. 307,273.

*To all whom it may concern:*

Be it known that I, WILLIAM H. FOX, a citizen of the United States, residing at Minneapolis, in the county of Hennepin and State of Minnesota, have invented certain new and useful Improvements in Demountable Rims; and I do hereby declare the following to be a full, clear, and exact description of the invention, such as will enable others skilled in the art to which it appertains to make and use the same.

My invention relates to improvements in demountable wheel rims; and, to this end, it consists of the novel devices and combinations of devices hereinafter described and defined in the claims.

In the accompanying drawings, which illustrate the invention, like characters indicate like parts throughout the several views.

Referring to the drawings:—

Figure 1 is a view partly in outside elevation and partly in circumferential section illustrating the invention applied to a wheel and holding a pneumatic tire thereon;

Fig. 2 is a view principally in transverse section taken on the line 2—2 of Fig. 1;

Fig. 3 is a tread elevation of the wheel with the demountable rim and tire removed therefrom;

Fig. 4 is a view of the demountable rim in transverse section with its detachably retaining flange removed therefrom;

Fig. 5 is a view of the detachably retaining flange in transverse section;

Fig. 6 is a detail view in section taken through the felly, felly-band and demountable rim on the line 6—6 of Fig. 3, on an enlarged scale;

Fig. 7 is a detail view principally in section taken on the line 7—7 of Fig. 1, on an enlarged scale;

Fig. 8 is a detail view in section taken on the line 8—8 of Fig. 1, on an enlarged scale;

Fig. 9 is a fragmentary perspective view of the felly-band and demountable rim looking at the same from the inside;

Fig. 10 is a perspective view of the felly and the felly-band, as shown in Fig. 9;

Fig. 11 is a perspective view of the key;

Figure 12:
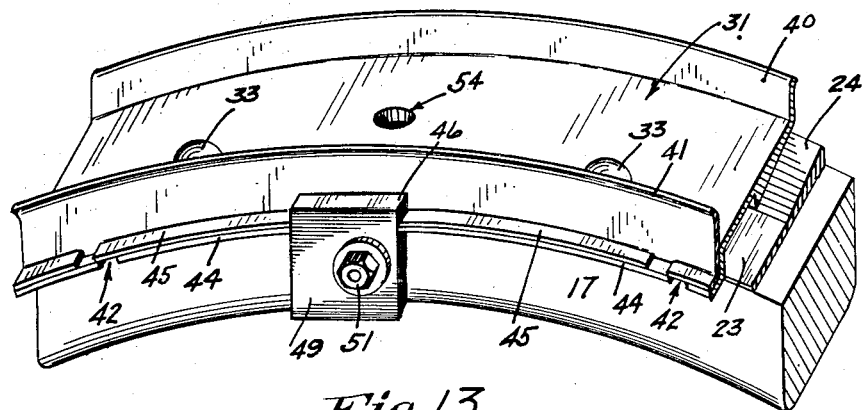
Fig. 12 is a perspective view of the parts shown in Fig. 9 and looking at the same from the outside.
Figure 13:
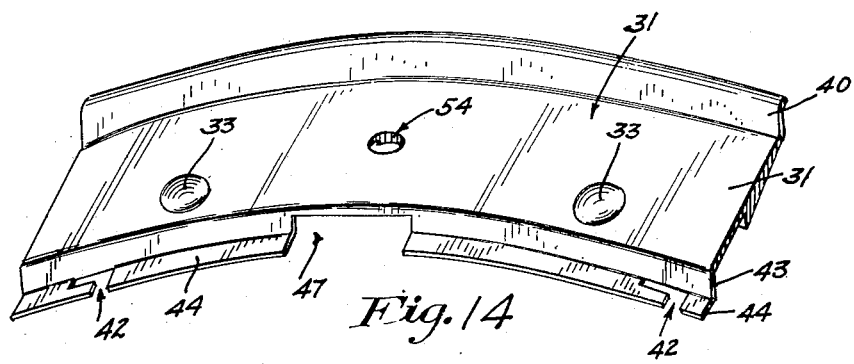
Fig. 13 is a perspective view of the demountable rim, as shown in Fig. 12, with its detachably retaining flange removed.
Figure 14:
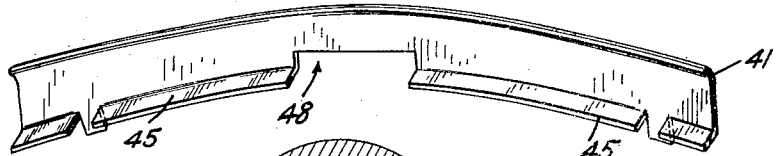
Fig. 14 is a perspective view of the detachably retaining flange, as shown in Fig. 12, and removed from the demountable rim.

The numeral 16 indicates an automobile wheel, as an entirety, with the exception of its felly 17, in the outer face of which is a radially extended valve stem channel 18 having in one of its sides a circumferentially offset semi-cylindrical valve stem seat 19, the axis of which is at the transverse center of said felly. The wheel 16 is equipped with a pneumatic tire, the casing of which has straight sides and which tire is indicated, as an entirety, by the numeral 20, with the exception of the valve stem 21 and its dust cap 22. The parts thus far described may be of standard form or any desired construction.

Referring now in detail to the invention, the numeral 23 indicates a felly-band permanently and rigidly secured on the periphery of the felly 17. Extending circumferentially around the felly-band 23 on the inner peripheral edge portion thereof and integrally formed therewith, is a cam flange 24 which is beveled transversely of the wheel 16. A plurality of circumferentially spaced gaps 25 are formed in the cam flange 24, and extending circumferentially through each of said gaps, is a joint flange 26 beveled in the same direction as said cam flange. The ends of the cam flange 24, at the gaps 25, are extended on radial lines and are oblique to the plane of the wheel 16 to afford shoulders 27 and 28, the former of which is a lock shoulder, as will presently appear. By reference to Fig. 3, it will be noted that the shoulders 27 and 28 converge toward the inner side of the wheel 16 and that the angle of the shoulder 27 is considerably flatter than that of the shoulder 28, at each gap 25.

On the periphery of the outer portion of the felly-band 23, is a plurality of circumferentially spaced cam lugs 29 that are beveled circumferentially of the wheel and in the same circumferential direction as the convergence of the shoulders 27 and 28. Also integrally formed on the periphery of the felly-band 23, in circumferential alinement with the cam lugs 29, is a lock lug 30 located in the vicinity of the channel 18 and on the opposite side thereof from the valve stem seat 19. It is important to note that the channel 18 and seat 19 extend through the felly-band 23, as best shown in Fig. 10.

Figure 15:
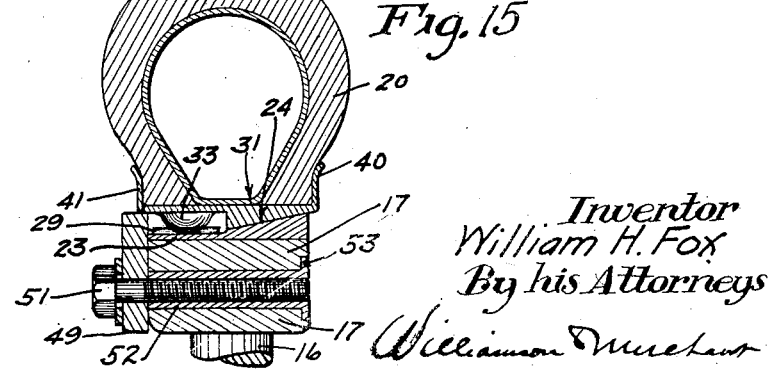
Fig. 15 is a view principally in transverse section taken on the line 15—15 of Fig. 1, on an enlarged scale.

Concentric with the felly-band 23, is a demountable rim 31, having an internal circumferentially extended cam flange 32 located at the same side of the wheel 16 as the cam flange 24, but reversibly beveled to fit thereover, as best shown in Fig. 15. Also formed on the internal face of the demountable rim 31, are a plurality of cam lugs 33, for coöperation with the cam lugs 29, to support the demountable rim 31 from the felly-band 23, together with the coöperating cam flanges 24 and 32. Further formed with the internal face of the demountable rim 31, are a plurality of lugs 34, arranged to enter the gaps 25 by compound axial and circumferential movement of the demountable rim 31 on the felly-band 23 and provided with circumferentially spaced radial shoulders 35 and 36, the former of which is a lock shoulder, said shoulders being oblique to the plane of the wheel 16 and extending in the same angles as the shoulders 27 and 28, respectively, to fit thereagainst, when the demountable rim 31 is secured to the felly-band 23. It is important to note that the angle of the engaging pair of lock shoulders 27 and 35 is such that the demountable rim 31 cannot be axially separated from the felly-band 23 without a slight circumferential movement, in respect thereto. The lugs 34 also have beveled joint surfaces 37 which engage the joint flanges 26, when the demountable rim 31 is secured on the felly-band 23, and thereby tightly close the gaps 25 in the cam flange 24, as best shown in Fig. 6.

A lock lug 38, for a purpose that will presently appear, is integrally formed with the inner face of the demountable rim 31, in circumferential alinement with the cam lugs 29, and provided with a cam surface 39 that is oblique to the plane of the wheel and circumferentially spaced from the lock lug 30. It is important to note that the lock lugs 30 and 38 are on opposite sides of the channel 18, when the demountable rim 31 is secured to the felly-band, and that the convergence of the cam surface 39, in respect to the adjacent face of the lock lug 30, is toward the inside of the wheel 16.

The demountable rim 31 is provided with inner and outer tire-retaining flanges 40 and 41, the former of which is integral with said rim and the latter of which is detachably secured thereto by bayonet joints 42. The demountable rim 31 has on its outer edge an inwardly projecting joint flange 43, on the inner edge of which is formed an outturned lock flange 44 in which the lock slot of the bayonet joints 42 are formed. On the inner edge of the tire-retaining flange 41, is an outturned lock flange 45, which telescopically fits over the lock flange 44 and holds said tire-retaining flange against radial movement. The lugs of the bayonet joints 42 are formed, as shown, by cutting the same from the lock flange 45 and turning said lugs inward into the plane of the tire-retaining flange 41. These lugs, when interlocked with the lock slots of the bayonet joints 42, securely hold the tire-retaining flange 41 against lateral movement. It is important to note that the joint flange 43 completely closes the opening between the periphery of the felly-band 23 and the demountable rim 31, at the outer side of the wheel 16.

To prevent a circumferential movement of the demountable rim 31 on the felly-band 23, in a direction to release the interlocking lock shoulders 27 and 35, a wedge-acting key 46 is inserted between the lugs 30 and 38. One edge of the key 46 is straight for contact with the lug 30 and the other edge thereof is beveled for contact with the cam surface 39. Obviously, the lock lug 30 affords a base of resistance for the key 46, while the same is being forced between the lock lug 30 and 38, with its beveled edge acting on the cam surface 39 of the lock lug 38, to impart a circumferential movement to the demountable rim 31 on the felly-band 23, and thereby carry the lock shoulders 35 into interlocking engagement with the lock shoulders 27. At the same time the demountable rim 31 is moved circumferentially on the felly-band 23, by the key 46, the lock shoulders 35, engaging the lock shoulders 27 with a cam-like action, will cause said rim to move radially inward on the felly-band, thus carrying the cam flange 32 into tight engagement with the cam flange 24.

It is, of course understood that the major part of the compound axial and circumferential movement of the demountable rim onto the felly-band will be imparted by hand, and that the final tightening movement thereof is imparted by the key 46. The final movement of the demountable rim onto the felly-band by the key 46 forces the cam flange 32 onto the cam flange 24, the cam lugs 33 onto the cam lugs 29, the lock shoulders 35 against the lock shoulders 27, the shoulders 36 against the shoulders 28, and the joint surfaces 37 against the joint flanges 26.

To permit the key 46 to enter between the lock lugs 30 and 38, lock notches 47 and 48 are formed, respectively, in the joint flange 41 and the lock flange 45, and, when the members of the bayonet joints 42 are interlocked, said two notches are in registration, the one with the other, as shown in Fig. 12. With the key 46 extending into the notches 47 and 48, the retaining flange 41 is securely held against circumferential movement in respect to the demountable rim 31 and with the members of the bayonet joints 42 in interlocking engagement. It will thus be seen that the single key 46 performs two functions, the one in which the demountable rim 31 is secured against a circumferential movement on the felly-band 23, in a direction to release the interlocking engagement of the lock shoulders 27 and 35, and thereby permit an axial separation of said rim from the felly-band, and the other of said functions in which the tire-retaining flange 41 is held against circumferential movement in a direction to permit separation of the bayonet joints 42, which hold said flange against axial separation from the demountable rim 31.

The key 46 is provided with an outwardly projecting body portion 49 arranged to bear against the outer face of the felly 17 and felly-band 23 to cover the channel 18. On the inner face of the body of the key 46, is a filler block or rib 50 arranged to enter the channel 18 and close the same, and thereby prevent said channel from weakening the felly 17. This filler block 50 also affords a support on which the lug 30 rests, as shown in Fig. 9. The key 46 is operated and secured to the felly 17 by a bolt 51 inserted through an aperture in the body of said key and has screw-threaded engagement with a thimble-like nut 52 which extends transversely through the felly and has on its inner end an annular shoulder 53 arranged to prevent said nut from pulling through the felly, under the drawing action of the bolt 51 in forcing the key 46 between the lugs 30 and 38. An aperture 54 is formed in the demountable rim 31 through which the valve stem 21 projects.

It is important to note that the walls of the valve stem channel 18 are both radially and transversely divergent and that the filler block 50 is correspondinglyy formed to closely engage the walls of said channel and close the same. The term "key" is herein used in a broad sense to cover various different forms of wedges, clamps and the like.

What I claim is:—

1. The combination with the felly of a wheel and a felly-band therefor, said felly and felly-band having a radial channel in one side thereof, of a demountable rim having interlocking engagement with the felly-band by a compound axial and circumferential movement, a pneumatic tire mounted on the demountable rim and having a valve stem extending radially therethrough for lateral movement into and out of said channel to permit the required compound axial and circumferential movement of the demountable rim during its application to the felly-band and its removal therefrom, and a key for holding the demountable rim against circumferential movement on the felly-band to release its interlocking engagement therewith, said key being provided with a filler block to close the channel in the felly of the wheel.

2. The combination with the felly of a wheel and a felly-band therefor, said felly and felly-band having a radial channel in one side thereof, of a demountable rim having interlocking engagement with the felly-band by a compound axial and circumferential movement, a pneumatic tire mounted on the demountable rim and having a valve stem extending radially therethrough for lateral movement into and out of said channel to permit the required compound axial and circumferential movement of the demountable rim during its application to the felly-band and its removal therefrom, a key for holding the demountable rim against circumferential movement on the felly-band to release its interlocking engagement therewith, said key being provided with a filler block to close the channel in the felly of the wheel, and a bolt for securing the key to the felly of the wheel.

3. The combination with a wheel having a radial channel in one side of its felly, of a demountable rim for the wheel, a pneumatic tire mounted on the rim and having a valve stem extending radially inward therethrough for lateral movement into and out of said channel to permit an axial movement of the demountable rim during its application to the wheel and its removal therefrom, and a filler block insertible into said channel to close the same by a lateral movement and held by the rim against outward movement.

4. The combination with a wheel, having in one side of its felly a wedge-shaped radially disposed channel, the sides of which are radially divergent, of a demountable rim for the wheel, a pneumatic tire mounted on the rim and having a valve stem extending radially inward therethrough for lateral movement into and out of said channel to permit an axial movement of the demountable rim during its application to the wheel and its removal therefrom, and a wedge-shaped filler block for closing said channel.

5. The combination with a wheel having a radial channel in one side of its felly, of a demountable rim for the wheel, a pneumatic tire mounted on the rim and having a valve stem extending radially inward therethrough for lateral movement into and out of said channel to permit an axial movement of the demountable rim during its application to the wheel and its removal therefrom, and a wedge shaped filler block insertible into said channel to close the same by a lateral movement and held by the rim against outward movement, the point of said block being extended toward the axis of the wheel.

6. The combination with a wheel having a radial channel in one side of its felly, of a demountable rim for the wheel, a pneumatic tire mounted on the rim and having a valve stem extending radially inward therethrough for lateral movement into and out of said channel to permit an axial movement of the demountable rim during its application to the wheel and its removal therefrom, and a key for holding the demountable rim against axial movement on the wheel, having a filler block for closing said channel.

In testimony whereof I affix my signature in presence of two witnesses.

WILLIAM H. FOX.

Witnesses:
 WINIFRED WARD,
 HARRY D. KILGORE.